United States Patent
Kohlmeier-Beckmann

(10) Patent No.: US 9,041,559 B2
(45) Date of Patent: May 26, 2015

(54) METHOD AND A MONITORING DEVICE FOR MONITORING A CABIN REGION, AND ALSO AN AIRCRAFT CABIN

(75) Inventor: Carsten Kohlmeier-Beckmann, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 541 days.

(21) Appl. No.: 13/426,686

(22) Filed: Mar. 22, 2012

(65) Prior Publication Data

US 2012/0242508 A1   Sep. 27, 2012

Related U.S. Application Data

(60) Provisional application No. 61/466,482, filed on Mar. 23, 2011.

(30) Foreign Application Priority Data

Mar. 23, 2011   (DE) .......................... 10 2011 005 955

(51) Int. Cl.
*B64D 45/00*   (2006.01)
*G08B 13/18*   (2006.01)
*G01V 8/12*   (2006.01)
*B64D 11/00*   (2006.01)

(52) U.S. Cl.
CPC ................ *G01V 8/12* (2013.01); *B64D 11/003* (2013.01); *B64D 45/00* (2013.01); *B64D 2045/0035* (2013.01)

(58) Field of Classification Search
CPC ......... B64D 11/003; B64D 45/00; G01V 8/12
USPC ................... 340/555–557, 686.1, 686.2, 945; 250/221–224
See application file for complete search history.

(56) References Cited

U.S. PATENT DOCUMENTS

| | | | | |
|---|---|---|---|---|
| 3,723,738 | A | * | 3/1973 | Brenner et al. ............. 250/338.1 |
| 3,946,376 | A | * | 3/1976 | Galvin ............................ 340/525 |
| 4,797,657 | A | * | 1/1989 | Vorzimmer et al. .......... 340/541 |
| 2003/0058105 | A1 | * | 3/2003 | Wuestefeld et al. ......... 340/556 |

FOREIGN PATENT DOCUMENTS

| | | |
|---|---|---|
| DE | 19732705 A1 | 2/1999 |
| DE | 102006042908 A1 | 10/2007 |

* cited by examiner

*Primary Examiner* — Brent Swarthout
(74) *Attorney, Agent, or Firm* — Carter, DeLuca, Farrell & Schmidt, LLP

(57) ABSTRACT

Disclosed is a method for the monitoring of a cabin region of a transport system located outside a field of view, wherein at least one light beam is emitted, passing through the cabin region in the longitudinal direction, and in the event of a disturbance of the at least one light beam path a message is generated. A monitoring device is also provided, with at least one emitter unit for purposes of emitting at least one light beam, with at least one receiver unit for purposes of receiving the emitted light beam, and with at least one messaging unit for purposes of generating a message in the event of a disturbance of the at least one light beam path; also disclosed is an aircraft cabin with at least one such monitoring system.

18 Claims, 4 Drawing Sheets

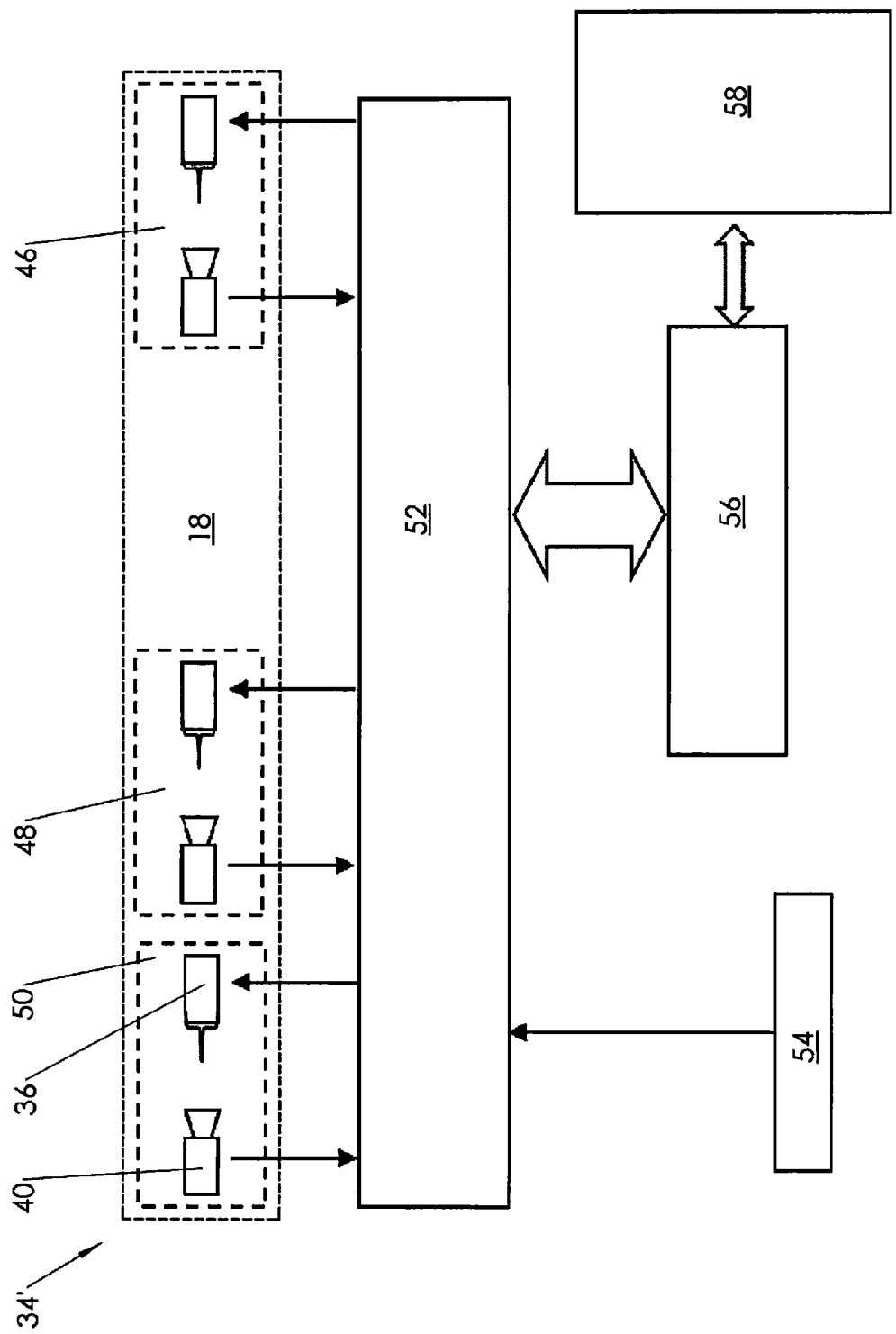

METHOD AND A MONITORING DEVICE FOR MONITORING A CABIN REGION, AND ALSO AN AIRCRAFT CABIN

TECHNICAL FIELD

The invention concerns a method and a monitoring device for monitoring a cabin region of a transport system located outside a field of view, and also an aircraft cabin with such a monitoring system.

BACKGROUND

Modern cabins of transport systems such as aircraft cabins are designed with a multiplicity of storage compartments for the storage or stowage of items of luggage, magazines and similar. The storage compartments are regularly distinguished by the fact that it is possible to see inside them very clearly, so that it can be easily discerned by the cabin personnel and the passengers at any time whether the storage compartment in question is occupied. Moreover, the storage compartments can be closed, or are designed such that in the event of turbulence the items accommodated cannot fall out. In addition, the aircraft cabins regularly have design elements so as to create a pleasant atmosphere for the passenger. However, as a result of the design elements cabin areas can be created, which in principle allow the accommodation of items, in particular of very small items, but which are located outside the field of view of the cabin personnel and the passengers, so that no simple and reliable visual check by the cabin personnel is possible to establish whether items are deposited in these cabin areas. One example for such cabin areas are lighting strips running in the longitudinal direction of the aircraft to provide indirect illumination of the ceiling above the overhead lockers. The lighting strips are formed from a multiplicity of light sources arranged one behind another, each of which is arranged behind an opaque panel. Each of the panels bounds, together with an opposing section of ceiling lining, a cabin region located outside a field of view that serves as an installation space for the light sources and is, for example, suitable for the accommodation of small, e.g. cylindrical, items. However, the installation spaces are not designed for the accommodation of items, so that in the event of turbulence, for example, items that are deposited in them fall down, and can represent a hazard for the cabin personnel and also for the passengers. Since the indirect illumination is not always switched on and shadows on the cabin ceiling do not provide clear evidence of items or foreign bodies located in these cabin areas, these cabin areas can only be checked manually and very laboriously. Moreover, there are official requirements to maintain cabin areas that are shielded from view free of items by means of operational or technical measures.

SUMMARY

The object of the invention is to create a method for monitoring a cabin region of a transport system that is located outside the field of view, which removes the above-cited disadvantages and enables reliable detection of foreign bodies in the cabin region. It is a further object of the invention to create a monitoring device for the execution of such a method, and also an aircraft cabin with at least one such monitoring device.

This object is achieved by a method with the features of Claim 1, by a monitoring device with the features of Claim 8, and by an aircraft cabin with the features of Claim 15.

In an inventive method for monitoring a cabin region of a transport system located outside the field of view a light beam is emitted, passing through the cabin region in the longitudinal direction, and in the event of a disturbance or interruption of the at least one light beam path a message is generated.

The method enables the reliable detection of foreign bodies in cabin areas that are shielded from view. The at least one light beam has an energy density such that the method does not have a disadvantageous effect on existing cabin illumination, and moreover any hazard to the cabin personnel or passengers is excluded. The light beam is preferably a laser beam.

Monitoring can be executed continuously or periodically. Continuous monitoring takes place automatically, and has the advantage that the message is triggered as soon as the foreign body is deposited, and thus the foreign body can be removed immediately. Periodic monitoring, on the other hand, can also be instigated manually, and requires less energy.

However, in order to avoid the occurrence of incorrect messages, for example as a result of an inadvertent incursion into the cabin region that is shielded from view, the message can be generated only after a certain duration of disturbance, i.e. after a persistent disturbance of the light beam path over a certain period of time.

Alternatively in the event of a disturbance of the light beam path a multiplicity of checking signals can be generated and the message is only generated after the occurrence of a certain number of checking signals.

In a preferred method monitoring is switched on or off as a function of the operational status of the transport system. By this means it is possible, for example, that during certain tasks that are to be undertaken on the cabin, such as cleaning tasks, in which the transport system is in what is primarily an inactive state, monitoring is deactivated, so that no messages are generated to disturb the cleaning procedure.

In order to be able to determine the position of the foreign body in the cabin region quickly and precisely the cabin region, in one of the inventive methods, is subdivided into individual zones, each of which is monitored by at least one independent light beam.

The message is preferably outputted to a display unit that is already installed, for example in a cabin management system. Such display units are regularly observed by the cabin personnel, so that the output of the message as an optical signal is already sufficient to alert the cabin personnel to a foreign body in the cabin region. The generation of an acoustic signal is therefore unnecessary.

An inventive monitoring device for executing such a method has at least one emitter unit for purposes of emitting at least one light beam through a cabin region outside a field of view, at least one receiver unit for purposes of receiving the emitted light beam, and at least one messaging unit for purposes of generating a message in the event of disturbance of the at least one light beam path.

Such a monitoring device allows the reliable monitoring of a cabin region shielded from view and by virtue of the small number of components can be installed in a space-saving manner. It can easily be installed in existing cabins in a manner that is quasi-invisible to the cabin personnel and the passengers, so that any positive overall impression generated by design elements is not impaired. The monitoring device is advantageously a laser device with an energy-saving pulsed laser diode as the emitter unit, and an optical photocell as the receiver unit.

For purposes of avoiding incorrect messages the monitoring device can have at least one checking system. In one example of embodiment the checking system is designed as a time delay system, such that the message is only generated after a certain disturbance duration. In another example of embodiment the checking system is designed as a multiple signal system, such that the message is only generated after the occurrence of a certain number of checking signals.

For the monitoring of curved cabin areas it is advantageous if the monitoring device has at least one system of deflection, for example, mirror optics, for purposes of deflecting the at least one light beam.

However, the deflection system allows also the combination of the emitter unit and the receiver unit in one emitter and receiver unit, or the arrangement of the emitter unit and receiver unit in a common end section of the cabin region, so that with just one diode it is possible, by the reflection of the laser beam at the deflection system installed at the opposite end section of the cabin region, to form two parallel laser beams in the cabin region, and by this means, to achieve a particularly extensive monitoring of the cabin region.

One example of embodiment of the monitoring device has a multiplicity of individual emitter units and receiver units for purposes of subdividing the cabin region into a multiplicity of individual local zones, as a result of which the deposited items can be accurately located within the cabin region.

The monitoring device preferably has at least one interface for purposes of integration into a cabin-based control and monitoring system. By this means coupling can take place with a cabin management system and also with a power supply that is already installed. Moreover the messages can be outputted via display units that are already installed. Furthermore operation of the monitoring device can take place via operations equipment that is already installed.

An inventive aircraft cabin has at least one monitoring system for purposes of monitoring a cabin region outside a field of view.

Such an aircraft cabin is distinguished by a particularly pleasant atmosphere, since design elements that create undercuts, or similar cabin areas that are shielded from view, can be more or less freely implemented by virtue of the reliable monitoring. In particular the inventive aircraft cabin can fulfil the official requirements, in accordance with which cabin areas that are shielded from view must be maintained free of items by means of operational or technical measures.

Other advantageous examples of embodiment of the invention are the subject of further subsidiary claims.

BRIEF DESCRIPTION OF THE DRAWINGS

In what follows preferred examples of embodiment of the invention are elucidated more detail with the aid of highly simplified schematic representations. Here:

FIG. 4 shows an installation of a second example of embodiment of an inventive monitoring system.

DETAILED DESCRIPTION

In the figures the same design elements are allocated the same reference numbers. However, in the interests of clarity, in the event of a plurality of the same elements in the figures just some of the elements are provided with a reference symbol.

Figure 1:
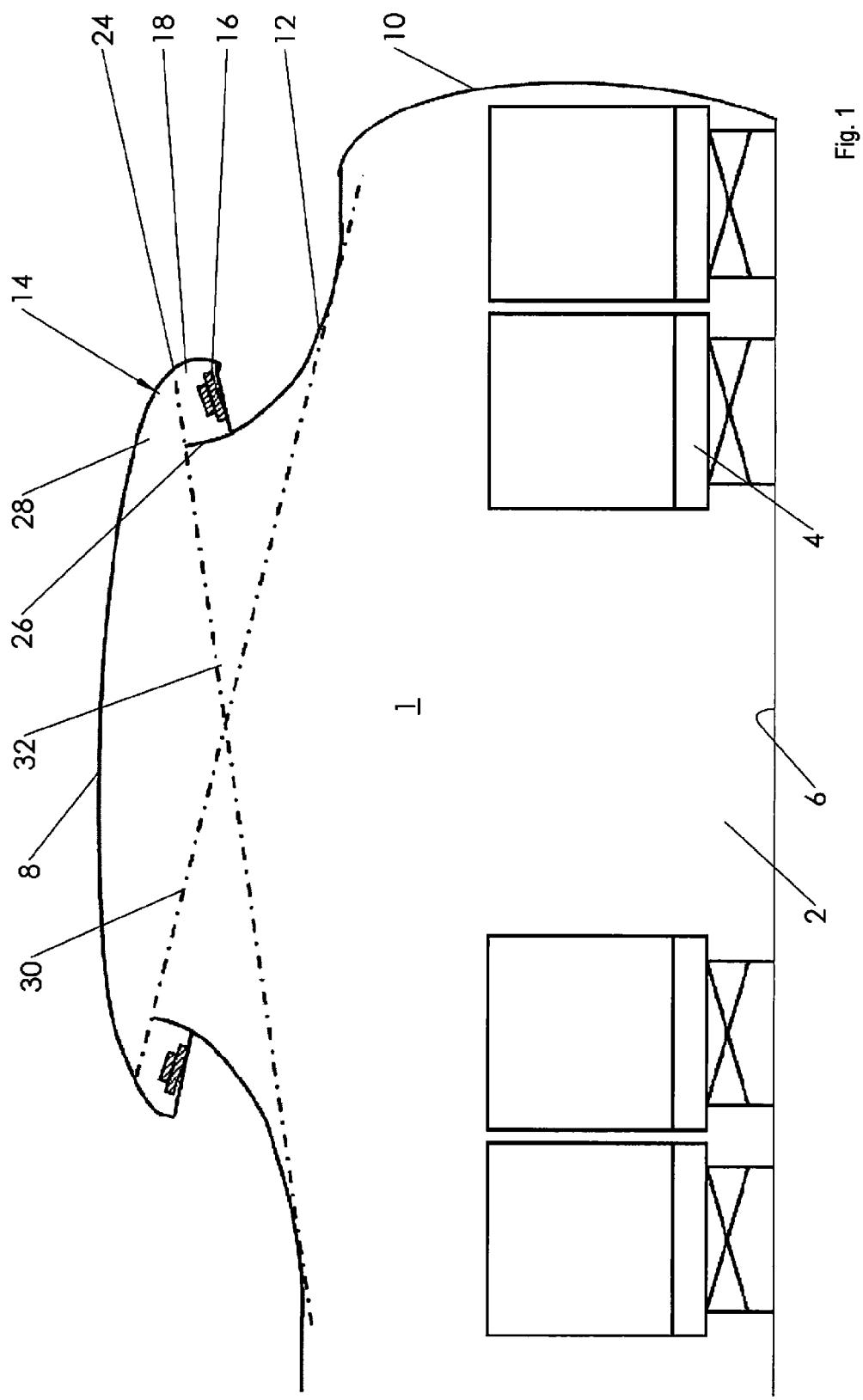
FIG. 1 shows a section through an inventive aircraft cabin.

FIG. 1 shows a view directed towards the tail onto an inventive cabin 1 of a commercial aircraft in the region of a port side gangway 2. In the cabin 1 are arranged a multiplicity of seats 4, assembled into individual seat rows, which are inserted into seat rails, not shown, running along the aircraft floor 6. In the vertical direction of the aircraft the cabin 1 is bounded by the aircraft floor 6 and by a ceiling lining 8. In the transverse direction of the aircraft the cabin 1 is bounded by opposing side panels 10, of which just one is visible, by virtue of the view shown. Above the seats 4 overhead lockers 12 are arranged in the direction of the gangway 2 between the side panel 10 and the ceiling lining 8; these can be opened for purposes of accommodating the passengers' hand luggage items.

Lighting strips 14 are arranged in the transition region between the overhead lockers 12 and the ceiling lining 8; these run in the longitudinal direction of the aircraft, and serve to provide indirect illumination of the cabin 1. The lighting strips 14 have a multiplicity of light sources 16, which are arranged one behind another in the installation space 18 in question.

Figure 2:
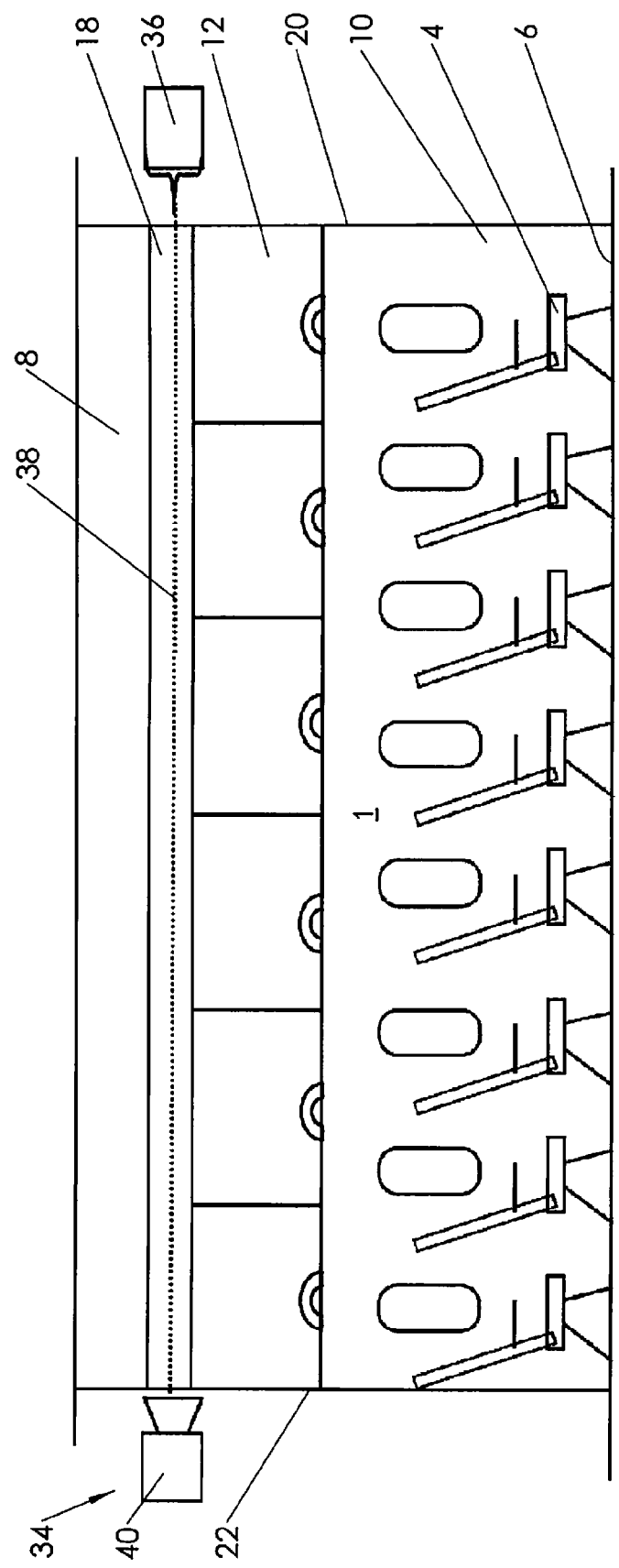
FIG. 2 shows a side view of the aircraft cabin with a first example of embodiment of an inventive monitoring system.

The installation spaces 18 in the aircraft longitudinal direction are in each case defined by a cockpit-side boundary 20 and a tail-side boundary 22 (see FIG. 2). In principle the installation spaces 18, and thus the lighting strips 14, can extend over the whole length of the cabin. In the transverse direction of the aircraft the installation spaces 18 are in each case formed from a side section 24 of the ceiling lining 8 and from an opposing gangway-side panel 26. The panels 26 are opaque and in each case define a lighting gap 28 in the direction of the ceiling lining 8. As is made clear in terms of the dashed sightlines, 30, 32, the installation spaces 18 are located outside a field of view of the cabin personnel or the passengers. For purposes of monitoring the installation spaces 18, and thus for purposes of fulfilling the official requirements that cabin areas that are shielded from view must be maintained free of items by means of operational or technical measures, a monitoring device 34 is therefore provided in each case, as shown in FIG. 2.

The monitoring device 34 has an emitter unit 36 for purposes of transmitting a light beam 38 in the longitudinal direction through the installation space 18 in question, and also a receiver unit 40 for purposes of receiving the emitted light beam 38.

In addition, the monitoring device 34 has a messaging unit for purposes of generating a message in the event of a disturbance of the light beam path. The messaging unit has at least two elements, wherein for purposes of clarity an element denoted as an electronics element is provided for the internal registration of the disturbance, and a display element is provided for the output of the disturbance as a message. The electronics element and the display element can, however, be integrated into a cabin-based control and monitoring system, i.e. into a cabin management system required for aircraft operations, which is described further in what follows.

The emitter unit 36 is arranged in the region of the cockpit-side boundary 20, and is preferably a laser diode, which emits a pulsed laser beam 38 with an energy density such that the indirect illumination of the lighting strip 14 in question is not impaired and at the same time there is no hazard to cabin personnel or passengers.

The receiver unit 40 is arranged opposite to the emitter unit 36 in the region of the tail-side boundary 22 of the cabin region 24 and is preferably a photocell that is sensitive to laser light.

Figure 3:
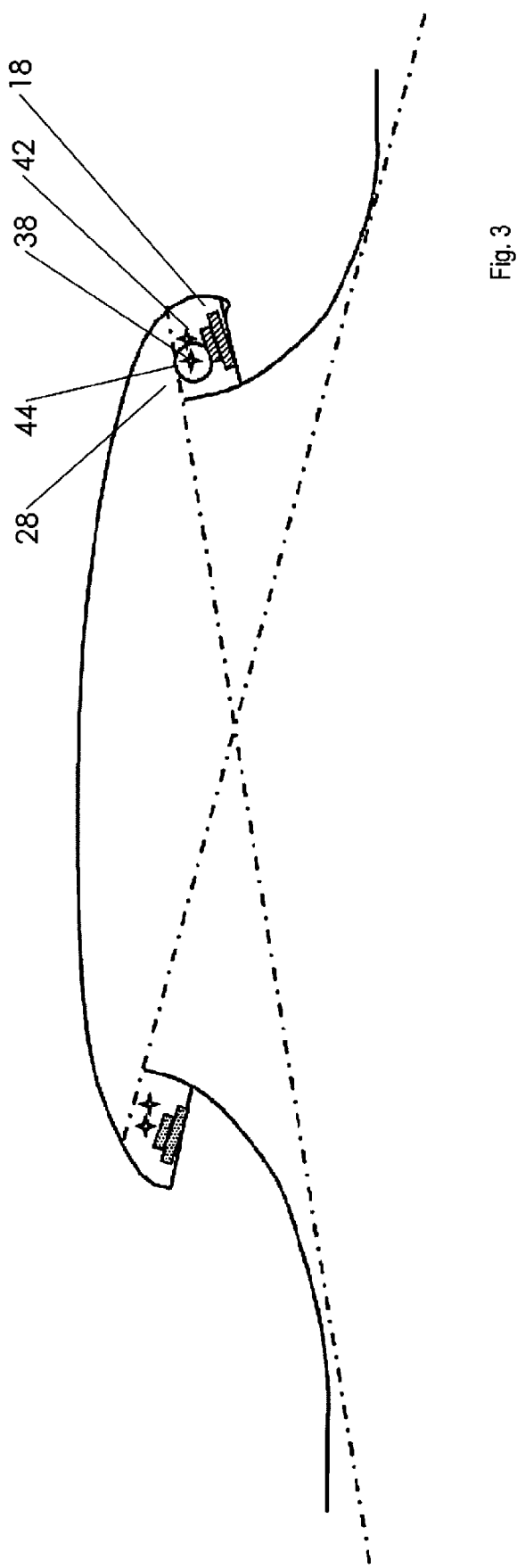
FIG. 3 shows a detailed view of the aircraft cabin in FIG. 1.

As shown in FIG. 3 the emitter unit 36 preferably emits a light beam, i.e. a parallel beam 42, running parallel to the first laser beam 38, as a result of which a more extensive monitoring of the installation space 18 in question can take place, i.e.

laser beams with relatively thin diameters can be emitted. For purposes of transmitting and receiving the parallel beam 42 the emitter unit 36 has a second laser diode and the receiver unit 40 preferably has a second photocell that is sensitive to laser light.

If now, as indicated by the circle in FIG. 3, a foreign body 44 is deposited through the lighting gap 28 into one of the installation channels 18, the path of the light beams 38, 42 in the longitudinal direction through the installation space 18 concerned is interrupted or disturbed. The monitoring device 34 registers the disturbance and via the messaging unit generates an appropriate message, upon which the cabin personnel are informed, the installation channel 18 in question is manually inspected, and the foreign body 44 is removed.

In principle, the monitoring of the installation spaces 18 takes place continuously during flight operations, since by this means the foreign bodies 44 can be detected as soon as they are placed in position. However, a periodic form of monitoring is also possible. However, to prevent false alarms, e.g. as a result of an inadvertent intrusion in the event of turbulence, for example, the monitoring device 34 has a checking system, which only releases the message concerning the disturbance of the light beam path for output if certain conditions are met. The checking system can be integrated into the electronics element of the messaging unit, and confirms the presence of the disturbance, wherein the message for the cabin personnel is only generated after confirmation of the disturbance. For this purpose the checking system is activated in the event of an interruption of the light beam path and an internal checking routine is initiated. The checking system is preferably a time delay system, which releases the message for output and display only after a prescribed duration of the disturbance to the light beam path, for example, a disturbance of the light beam path that persists for more than a minute. Alternatively, however, the checking system can also be a multiple signal system, which in the event of an interruption of the light beam path generates a multiplicity of checking signals, and only after the occurrence of a certain number of checking signals, for example, in the event of a five-times occurrence of a checking signal, releases the message concerning the disturbance for output.

In order for it to be unnecessary to examine the installation space 18 in question over its whole axial length in the event of a message, but rather to have to undertake only a limited local examination, a monitoring device 34' shown in FIG. 4 provides a multiplicity of individual emitter units 36 and receiver units 40; in each case these are combined into pairs and allow a sub-division of the installation spaces 18 into local zones 46, 48, 50. If, for example, a disturbance of the light beam or beams 38, 42 is indicated in the cockpit-side zone 46, the cabin personnel only have to examine this zone 46. If, on the other hand, a disturbance in the tail-side zone 50 is signalled, only this zone 50 must be examined. Accordingly the examination can take place quickly in a targeted manner.

The monitoring devices 34, 34', as shown in FIG. 4 by the monitoring devices 34' as an example, and indicated by the short individual arrows, are in each case integrated into a cabin-based control and monitoring system 52 required for aircraft operations, which, for example, controls and monitors the cabin internal pressure, the cabin temperature, the air conditioning system, the illumination, etc. The control and monitoring system 52, as indicated by a long individual arrow, is connected with a power supply 54, and communicates, as indicated by the thick double arrow, with a cabin management system 56. The latter, as indicated by the thin double arrow, is operated via a combined operation and display unit 58.

Thus on the first count it is possible to activate the monitoring devices 34, 34' via the operation and display unit 58 that is already installed. On the second count it is possible for the messages of the monitoring devices 34 to be outputted via the operation and display unit 58. Output of the message primarily takes the form of a so-called "silent message", in terms of just an optical signal with no acoustic signal.

Furthermore the integration of the monitoring devices 34, 34' into the control and monitoring system required for aircraft operations, enables their activation and deactivation as a function of the particular operational status of the aircraft. If, for example, the aircraft is at rest on the ground, the monitoring devices 34, 34' are switched into a so-called "ground mode" and as a result are deactivated. This can be undertaken, for example, via a cockpit door lock, such that in the event of a reactivation of the door lock the monitoring devices 34, 34' are activated.

In a similar manner the integration of the monitoring devices 34, 34' into the control and monitoring system 52 required for aircraft operations also enables a so-called "failsafe" function to be utilised in the monitoring devices 34, 34'. Here the monitoring devices 34, 34' are continuously checked for the unlikely event of a defective function. In the event of a defective function an appropriate message is then outputted to the operation and display unit 58.

Disclosed is a method for the monitoring of a cabin region of a transport system located outside a field of view, wherein at least one light beam is emitted, passing through the cabin region in the longitudinal direction, and in the event of a disturbance of the at least one light beam path a message is generated; also disclosed is a monitoring device, with at least one emitter unit for purposes of emitting at least one light beam, with at least one receiver unit for purposes of receiving the emitted light beam, and with at least one messaging unit for purposes of generating a message in the event of a disturbance of the at least one light beam path; also disclosed is an aircraft cabin with at least one such monitoring system.

The invention claimed is:

1. A method for the monitoring of a cabin region of a passenger transport vehicle located outside a field of view, comprising:
   emitting from an emitting unit at least one light beam such that the at least one light beam passes through the cabin region in a longitudinal direction; and
   generating a message from a messaging unit in the event of a disturbance of a light beam path due to the presence of an unauthorized object in the cabin region,
   wherein the cabin region is an installation space accommodating a plurality of light sources, and the cabin region is disposed between an overhead storage locker and a ceiling lining of the passenger transport vehicle.

2. The method in accordance with claim 1, further comprising executing a continuous form of monitoring.

3. The method in accordance with claim 1, further comprising executing a periodic form of monitoring.

4. The method in accordance with claim 2, wherein the message is generated only after a certain duration of the disturbance of the light beam path.

5. The method in accordance with claim 3, wherein the message is generated only after a certain duration of the disturbance of the light beam path.

6. The method in accordance with claim 2, wherein in the event of a disturbance of the light beam path a multiplicity of checking signals are generated, and the message is only generated after an occurrence of a certain number of checking signals.

7. The method in accordance with claim 3, wherein in the event of a disturbance of the light beam path a multiplicity of checking signals are generated, and the message is only generated after an occurrence of a certain number of checking signals.

8. The method in accordance with claim 1, wherein the monitoring is switched on or off as a function of the operational status of the passenger transport vehicle.

9. The method in accordance with claim 1, wherein the cabin region is subdivided into zones and at least one light beam is transmitted through each zone in the longitudinal direction.

10. The method in accordance with claim 1, wherein the message is outputted to a display unit.

11. A monitoring device, comprising:
   at least one emitter unit for purposes of transmitting at least one light beam through a cabin region outside a field of view in a passenger transport vehicle;
   at least one receiver unit for purposes of receiving the emitted light beam; and
   at least one messaging unit for purposes of generating a message in the event of a disturbance of an at least one light beam path due to the presence of an unauthorized object in the cabin region, wherein the cabin region is an installation space accommodating a plurality of light sources, and the cabin region is disposed between an overhead storage locker and a ceiling lining of a passenger transport vehicle.

12. The monitoring device in accordance with claim 11, wherein a time delay system is provided for purposes of generating the message only after a certain duration of the disturbance.

13. The monitoring device in accordance with claim 11, wherein a multiple signal system is provided for purposes of generating the message only after an occurrence of a certain number of checking signals.

14. The monitoring device in accordance with claim 11, wherein at least one deflection system is provided for purposes of deflecting the at least one light beam.

15. The monitoring device in accordance with claim 11, wherein the at least one emitter unit and the at least one receiver unit are combined into an emitter and receiver unit.

16. The monitoring device in accordance with claim 11, wherein a multiplicity of individual emitter units and receiver units are provided for purposes of subdividing the cabin region into a multiplicity of individual local zones.

17. The monitoring device in accordance with claim 11, wherein at least one interface is provided for purposes of integration into a cabin-based control and monitoring system.

18. An aircraft cabin comprising:
   at least one monitoring device including:
      at least one emitter unit for purposes of transmitting at least one light beam through a cabin region outside a field of view in a passenger cabin of the aircraft;
      at least one receiver unit for purposes of receiving the emitted light beam; and
      at least one messaging unit for purposes of generating a message in the event of a disturbance of an at least one light beam path due to the presence of an unauthorized object in the cabin region, wherein the cabin region is an installation space accommodating a plurality of light sources, and the cabin region is disposed between an overhead storage locker and a ceiling lining of the aircraft.

* * * * *